Feb. 20, 1934.  K. POSTHUMUS  1,947,569
DETECTOR CIRCUIT
Filed April 9, 1930
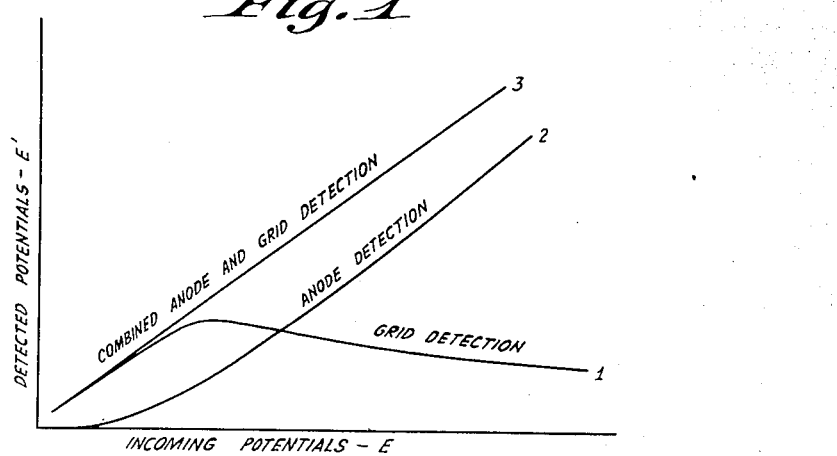
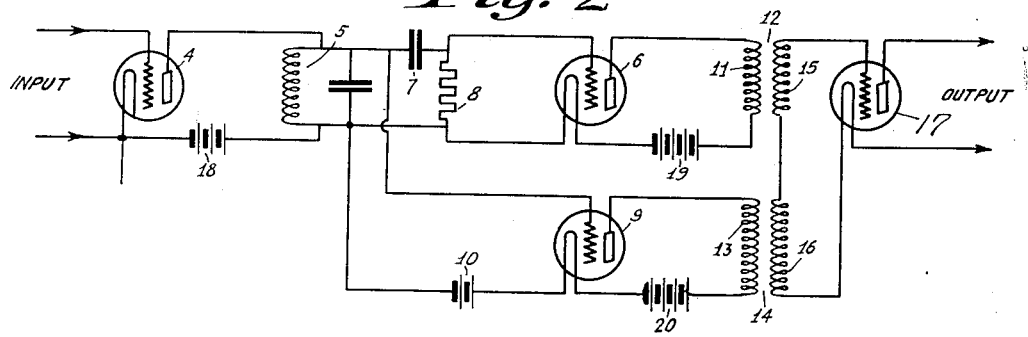
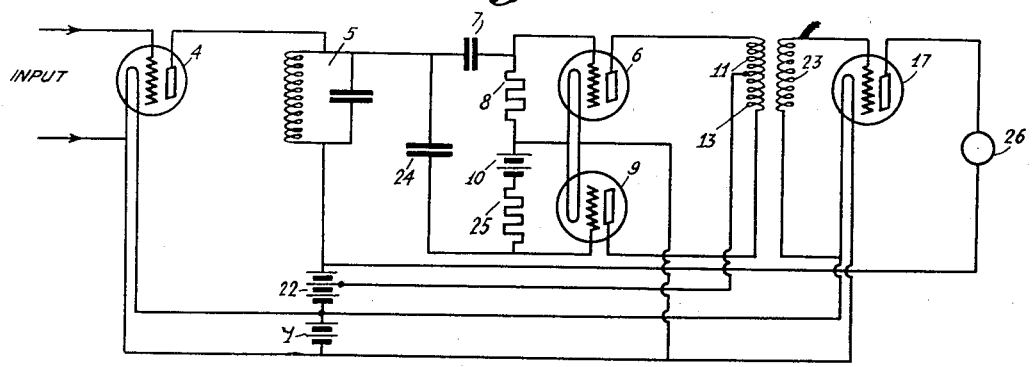
INVENTOR
KLAAS POSTHUMUS
BY
ATTORNEY Patented Feb. 20, 1934

1,947,569

UNITED STATES PATENT OFFICE 1,947,569

DETECTOR CIRCUIT

Klaas Posthumus, Eindhoven, Netherlands, assignor to Radio Corporation of America, a corporation of Delaware Application April 9, 1930, Serial No. 442,811, and in the Netherlands May 23, 1929

4 Claims. (Cl. 250—27)

The present invention relates to detector circuit arrangements, and it seeks to obtain, for its main object, utmost linear detection.

It is known that when grid detection is employed the curve indicating the values of the detected potentials varies at first linearly with the amplitude of the incoming oscillations, subsequently ascends less rapidly, and finally falls off so that with very strong incoming oscillations the detected potential decreases. With anode detection it is quite the reverse. In this case the strength of the detected oscillations at first increases squarely with the amplitude of the received oscillations to approximate more and more to a linear course when the strength of the received oscillations increases.

According to the present invention, this circumstance is utilized to obtain detection which is linear over the whole region. For this purpose use is made of a circuit arrangement with which the currents or potentials obtained by anode detection and grid detection are combined in such manner that the curve of the combined detection is substantially linear. For this purpose, the received potential may be caused to act both on the grid circuit of a detector arranged for grid detection, and on the grid circuit of a detector designed for anode detection, the anode currents being combined in a suitable manner with the aid of a transformer or resistance, or, in general, an impedance.

According to the invention, another important object is that the two detector valves may also be combined to form a unit, and to provide, further, linear detector action with comparatively small input voltages.

The novel features which I believe to be characteristic of my invention are set forth in particularity in the appended claims, the invention itself, however, as to both its organization and method of operation will best be understood by reference to the following description taken in connection with the drawing in which I have indicated diagrammatically several circuit organizations whereby my invention may be carried into effect.

The invention will be more clearly understood by referring to the accompanying drawing, in which, Fig. 1 graphically shows the results produced by the invention and prior detection methods, Fig. 2 represents a circuit arrangement embodying the invention, and, Fig. 3 is a modified form of the invention.

Referring now to the drawing in which like characters of reference in the different figures designate the same elements, in Fig. 1 the strength of the detected potentials is plotted against the incoming potentials E. The abscissæ indicate the different values of the incoming potentials E, and the ordinates give the corresponding values of the detected potentials or currents E'. 1 is the grid detection curve; 2 is the anode detection curve; and 3 is the combined curve. The curve 1 at first ascends linearly, then it rises less, it reaches a maximum, and subsequently it falls off again gently. The curve representing the anode detection at first ascends squarely and consequently gently, nearly at the maximum point of the grid detection curve, it begins to ascend more rapidly and from this point it increases almost linearly. The combined curve 3 is linear nearly over the whole region shown.

The circuit arrangement by which curve 3 of Fig. 1 is obtained is represented in Fig. 2, in which circuit 4 denotes a high frequency amplifying triode the anode circuit of which comprises a tuned circuit 5 consisting of self-inductance and capacity. This circuit 5 is included on the one hand in the grid circuit of a detector 6, the latter being connected as a detector with grid detection. For this purpose there are provided a grid condenser 7 and a leakage resistance 8.

On the other hand, the tuned circuit 5 is also connected to the grid circuit of a detector 9 which operates with anode detection, and for which purpose there is provided a grid bias battery 10 whereby the required bias is applied to the grid of the detector 9. The anode circuit of the detector 6 comprises the primary winding 11 of a transformer 12, and the anode circuit of the detector 9 comprises the primary 13 of a transformer 14. The secondary windings 15 and 16 of the transformers 12 and 14 are connected in series with each other and are included in the grid circuit of a low frequency amplifying triode 17.

By correctly connecting the secondary windings 15 and 16, it is found that the detected potentials are added in the correct phase, and together act on the grid of the triode 17. In the drawing it has been assumed that all the thermionic devices have anode batteries 18, 19 and 20 of their own. However, the circuit arrangement may be such that all the thermionic devices are fed by a common anode voltage battery, or by another common anode voltage supply.

Fig. 3 is substantially analogous to Fig. 2, and only differs therefrom in that Fig. 3 represents a circuit arrangement in which the various anodes are fed by a single battery 22, while, in addition, a common filament battery 21 has been provided. Since the filaments of the two detector valves 6 and 9 in Fig. 3 have a point in common, the anode of the preceding amplifying valve is connected through a separating condenser 24 to the grid of the detector 9. The grid bias required for this grid is supplied by a grid battery 10 which is connected in series with a high resistance 25.

It is evident that the required grid bias may also be taken in the manner well known to the art, viz., from a resistance connected in series with the battery 22. A single secondary winding 23 is substituted for the secondary windings 15 and 16 of the transformers 12 and 14, while the anode circuit of the amplifier 17 comprises an indicating instrument 26. In the given example the anode voltage of the detector valves is slightly lower than the anode voltage of the amplifying valve.

In the circuit shown in Figs. 2 and 3, the detected currents are combined by means of a transformer. It is evident, however, that these currents may also be combined with the aid of a resistance. As the strength of the anode detection differs in general from that of the grid detection, this difference must be taken into account in combining. For each particular case the correct ratio can easily be determined. In the examples given for example, the primary windings 11 and 13 can be given a different number of turns. If the detected potentials are combined with the aid of a resistance, the resistance included in the anode circuit of the detector 6 must have a value different from that of the resistance included in the anode circuit of the detector 9. The same remarks apply, of course, if instead of resistance coupling, choke-coil coupling is utilized.

The two detector valves can be easily combined so as to form a unit and, if desired, the required resistances and condensers may be incorporated in the foot of the combined valve. The circuit arrangements, according to the invention, ensures that for the signal strengths occurring in practice the detection has a linear course, that is to say: the amplitude of the detected potentials is a linear function of the amplitude of the incoming oscillations. Also, it will be seen that linear detector action is obtained with comparatively small input voltages.

While I have indicated and described several systems for carrying my invention into effect, it will be apparent to one skilled in the art that my invention is by no means limited to the particular organizations shown and described, but that many modifications in the circuit arrangements, as well as in the apparatus employed, may be made without departing from the scope of my invention as set forth in the appended claims.

What I claim is:

1. In combination, a pair of detector tubes, a common input circuit for said tubes tuned to a desired signal frequency, means connected to the grid of one tube to render it operative as a grid circuit rectifier, means connected to the grid of the other tube to render it operative as an anode circuit rectifier, a condenser coupling the grid of one tube with one side of said circuit, a second condenser coupling the same side of said circuit with the grid of the other tube, a resistive path connected between both said grids and in shunt with said condensers, a common output circuit for both tubes arranged to additively combine the outputs of both tubes, and means for connecting an intermediate point on said path and the cathodes of the tubes to the other side of said input circuit.

2. In combination, a pair of detector tubes, a common input circuit for said tubes tuned to a desired signal frequency, a condenser coupling the grid of one tube with one side of said circuit, a second condenser coupling the same side of said circuit with the grid of the other tube, a resistive path connected between both said grids and in shunt with said condensers, said path including means for applying a negative bias to the grid of one of the tubes, to render it operative as an anode circuit rectifier, means connected to the grid of the other tube for rendering it operative as a grid circuit rectifier, a common output circuit for both tubes arranged to additively combine the outputs of both tubes, and means for connecting an intermediate point on said path and the cathodes of the tubes to the other side of said input circuit.

3. In combination, a pair of detector tubes, a common input circuit for said tubes tuned to a desired signal frequency, means connected to the grid of one tube to render it operative as a grid circuit rectifier, means connected to the grid of the other tube to render it operative as an anode circuit rectifier, a condenser coupling the grid of one tube with one side of said circuit, a second condenser coupling the same side of said circuit with the grid of the other tube, a resistive path connected between both said grids and in shunt with said condensers, a common output circuit for both tubes, and means for connecting an intermediate point on said path and the cathodes of the tubes to the other side of said input circuit, said connecting means including a source of positive potential for the anodes of said tubes.

4. In combination with a high frequency amplifier and a low frequency amplifier, a detector comprising a pair of tubes provided with a common tuned input circuit connected between the high frequency amplifier and the input electrodes of said detector tubes, a common output circuit connected between said detector tubes and said low frequency amplifier, a condensive path between the high potential side of said input circuit and the grid of each detector tube, one of said tubes including means for operating it as a grid circuit rectifier and the other including means for operating it as an anode circuit rectifier, said common output circuit being arranged to additively combine the rectified outputs of said tubes, a connection between the cathodes of said detector tubes and the low potential side of the said input circuit, said connection including a source of common positive potential for the anodes of said amplifiers and detector tubes.

KLAAS POSTHUMUS.